(12) United States Patent
Clark et al.

(10) Patent No.: US 11,163,914 B2
(45) Date of Patent: Nov. 2, 2021

(54) MANAGING ENTERPRISE SECURITY BY UTILIZING A SMART KEYBOARD AND A SMART MOUSE DEVICE

(71) Applicant: Bank of America Corporation, Charlotte, NC (US)

(72) Inventors: Elijah Clark, Charlotte, NC (US); Edward Lee Traywick, Charlotte, NC (US); George Albero, Charlotte, NC (US); Elizabeth R. Liuzzo, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 175 days.

(21) Appl. No.: 16/529,334

(22) Filed: Aug. 1, 2019

(65) Prior Publication Data

US 2021/0034792 A1    Feb. 4, 2021

(51) Int. Cl.

| | |
|---|---|
| *G06F 21/83* | (2013.01) |
| *G06F 21/32* | (2013.01) |
| *G06F 3/0362* | (2013.01) |
| *G06F 3/02* | (2006.01) |
| *G06F 3/0354* | (2013.01) |
| *G06F 3/01* | (2006.01) |

(52) U.S. Cl.
CPC .............. *G06F 21/83* (2013.01); *G06F 3/015* (2013.01); *G06F 3/0219* (2013.01); *G06F 3/0362* (2013.01); *G06F 3/03543* (2013.01); *G06F 21/32* (2013.01)

(58) Field of Classification Search
CPC .... G06F 3/015; G06F 3/0219; G06F 3/03543; G06F 3/0362; G06F 21/83; G06F 21/32
See application file for complete search history.

(56) References Cited

U.S. PATENT DOCUMENTS

| | | | |
|---|---|---|---|
| 5,736,976 A | * | 4/1998 | Cheung ................. G06F 3/0219 341/22 |
| 8,272,053 B2 | | 9/2012 | Markham et al. |
| 8,607,340 B2 | | 12/2013 | Wright |
| 8,793,790 B2 | | 7/2014 | Khurana et al. |
| 9,047,464 B2 | | 6/2015 | Sambamurthy et al. |
| 9,092,605 B2 | | 7/2015 | Sambamurthy et al. |

(Continued)

*Primary Examiner* — Ariel A Balaoing
(74) *Attorney, Agent, or Firm* — Banner & Witcoff, Ltd.; Michael A. Springs (57) ABSTRACT

Aspects of the disclosure relate to managing enterprise security by utilizing a smart keyboard and a smart mouse. The smart keyboard may include pressure sensitive keys, a physical sensor configurable to detect a user characteristic associated with a user of the smart keyboard, an image capturing device configurable to capture an image of an activity in a vicinity of the smart keyboard, and a switch, communicatively coupled to the pressure sensitive keys, the physical sensor, and the image capturing device, where the switch is configurable to activate or deactivate the pressure sensitive keys, the physical sensor, and the image capturing device. The smart mouse may include a wheel, one or more pressure sensitive clickable components, and at least one physical sensor configurable to detect a user characteristic associated with a user of the smart mouse. Systems and methods for utilizing a smart keyboard and a smart mouse are also disclosed.

10 Claims, 7 Drawing Sheets

(56) References Cited

U.S. PATENT DOCUMENTS

| | | | |
|---|---|---|---|
| 9,111,088 B2 | 8/2015 | Ghai et al. | |
| 9,118,702 B2 | 8/2015 | MaCaulay | |
| 9,280,661 B2 | 3/2016 | Adjaoute | |
| 9,367,694 B2 | 6/2016 | Eck et al. | |
| 9,648,039 B1 | 5/2017 | Lipinski et al. | |
| 9,652,597 B2 | 5/2017 | Roundy et al. | |
| 10,027,711 B2 | 7/2018 | Gill et al. | |
| 2002/0152372 A1* | 10/2002 | Cole | G06F 1/1616 713/2 |
| 2003/0214484 A1* | 11/2003 | Haywood | G06F 3/03543 345/163 |
| 2004/0022421 A1* | 2/2004 | Endoh | G06F 3/03543 382/115 |
| 2006/0007151 A1* | 1/2006 | Ram | G06F 3/038 345/163 |
| 2006/0274042 A1* | 12/2006 | Krah | G06F 3/03543 345/163 |
| 2007/0057918 A1* | 3/2007 | Zhou | G06F 3/0383 345/163 |
| 2009/0027337 A1* | 1/2009 | Hildreth | G06F 3/0482 345/158 |
| 2009/0134972 A1* | 5/2009 | Wu, Jr. | G06F 21/316 340/5.82 |
| 2009/0296997 A1* | 12/2009 | Rocheford | G06F 21/35 382/124 |
| 2011/0023115 A1* | 1/2011 | Wright | G06F 21/552 726/22 |
| 2011/0157019 A1* | 6/2011 | Miura | G06F 1/3259 345/163 |
| 2011/0216007 A1* | 9/2011 | Cheng | G06F 3/0488 345/168 |
| 2012/0092293 A1* | 4/2012 | Ganapathi | G06F 3/0446 345/174 |
| 2014/0104173 A1* | 4/2014 | Bruno | G06F 3/0227 345/168 |
| 2015/0070301 A1* | 3/2015 | Chia | G06K 9/0002 345/174 |
| 2015/0186631 A1* | 7/2015 | Bruno | G06F 3/0219 726/16 |
| 2015/0254444 A1* | 9/2015 | Herger | G06F 3/023 726/19 |
| 2017/0214701 A1 | 7/2017 | Hasan | |
| 2019/0121972 A1 | 4/2019 | Norvill et al. | |

* cited by examiner

MANAGING ENTERPRISE SECURITY BY UTILIZING A SMART KEYBOARD AND A SMART MOUSE DEVICE

BACKGROUND

Aspects of the disclosure relate to smart computing devices configurable to detect unauthorized user activity, and deploying digital data processing systems to real-time processing of input data to identify unauthorized activities and prevent such activities in an enterprise system. In particular, one or more aspects of the disclosure relate to a smart keyboard, a smart mouse, and a system comprising the smart keyboard and the smart mouse to process input data from the smart keyboard and the smart mouse.

Enterprise organizations may utilize various computing infrastructure to identify enterprise users associated with potentially unauthorized activities at their enterprise facilities. Such identifying may be time-sensitive and may need to be performed in real-time. In some instances, the identifying may include confidential information and/or other sensitive data that is created, transmitted, and/or used for various purposes. Ensuring that potentially unauthorized activities are identified in a timely manner, and appropriate remediation measures are initiated to minimize an impact to enterprise services, may be highly advantageous to prevention of actual threat incidents. In many instances, however, it may be difficult to identify enterprise users associated with potentially unauthorized activities, and undertake appropriate remediation measures to prevent and/or mitigate the impact to enterprise services with speed and accuracy, while also attempting to optimize network resources, bandwidth utilization, and efficient operations of the associated computing infrastructure.

SUMMARY

Aspects of the disclosure provide effective, efficient, scalable, fast, reliable, and convenient technical solutions that address and overcome the technical problems associated with managing enterprise security by utilizing a smart keyboard and a smart mouse.

In accordance with one or more embodiments, a smart keyboard having at least one processor, a communication interface, and memory may include one or more pressure sensitive keys, at least one physical sensor configurable to detect a user characteristic associated with a user of the smart keyboard, at least one image capturing device configurable to capture an image of an activity in a vicinity of the smart keyboard, and a switch, communicatively coupled to the one or more pressure sensitive keys, the at least one physical sensor, and the at least one image capturing device, where the switch is configurable to activate or deactivate the one or more pressure sensitive keys, the at least one physical sensor, and the at least one image capturing device.

In some embodiments, the at least one physical sensor may be configurable to detect a fingerprint associated with the user. In some embodiments, the at least one physical sensor may be configurable to detect an electrothermal activity associated with the user. In some embodiments, the electrothermal activity may include a change in skin conductivity associated with the user.

In some embodiments, the at least one physical sensor may be configurable to detect a respiratory activity associated with the user.

In some embodiments, the image capturing device may be configurable to detect, based on facial recognition techniques, a change in facial activity associated with the user.

In some embodiments, the one or more pressure sensitive keys may be configurable to detect a typing activity associated with the user.

In some embodiments, the smart keyboard may be configurable to detect abnormal typing activity indicative of a presence of malware.

In accordance with one or more embodiments, a smart mouse having at least one processor, a communication interface, and memory may include a wheel, one or more pressure sensitive clickable components, and at least one physical sensor configurable to detect a user characteristic associated with a user of the smart mouse.

In some embodiments, the at least one physical sensor may be configurable to detect a fingerprint associated with the user of the smart mouse.

In some embodiments, the at least one physical sensor may be configurable to detect an electrothermal activity associated with the user of the smart mouse.

In some embodiments, the smart mouse may include an image capturing device, where the image capturing device is configurable to capture an image of an activity in a vicinity of the smart mouse.

In some embodiments, the wheel may be configurable to detect a scrolling activity associated with the user of the smart mouse.

In some embodiments, the smart mouse may include an infrared beam, where the smart mouse is configurable to detect, based on the infrared beam, a movement activity of the smart mouse associated with the user of the smart mouse.

In accordance with one or more embodiments, a computing platform having one or more processors, a communication interface, and memory may include a smart keyboard, where the smart keyboard may include one or more pressure sensitive keys, at least one physical sensor configurable to detect a user characteristic associated with an enterprise user, at least one image capturing device that may be configurable to capture an image of an activity in a vicinity of the smart keyboard, and a switch, communicatively coupled to the one or more pressure sensitive keys, the at least one physical sensor, and the at least one image capturing device, where the switch may be configurable to activate or deactivate the one or more pressure sensitive keys, the at least one physical sensor, and the at least one image capturing device, and where the computing platform may receive an input, via the smart keyboard, where the input may include one or more of keystroke data from the one or more pressure sensitive keys, the user characteristic and the image of the activity. Then, the computing platform may retrieve, from a database, historical user data associated with the input and the enterprise user. Subsequently, the computing platform may identify, based on a comparison of the input and the historical user data, a discrepancy associated with the input. Then, the computing platform may initiate, in response to the discrepancy, one or more remediation tasks.

In some embodiments, the computing platform may include a smart mouse, where the smart mouse may include a wheel, one or more pressure sensitive clickable components, and at least one additional physical sensor configurable to detect the user characteristic associated with the enterprise user, and where the computing platform may receive a second input, via the smart mouse, where the second input may include one or more of scrolling data from the wheel, click data from the one or more pressure sensitive clickable components, and the user characteristic associated with the enterprise user. Then, the computing platform may retrieve, from the database, additional historical user data associated with the input and the enterprise user. Then, the computing platform may identify, based on a second comparison of the second input and the second historical user data, a second discrepancy associated with the second input. Subsequently, the computing platform may perform the initiating the one or more remediation tasks based on the second discrepancy.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Enterprise users (e.g., employees of an enterprise organization, such as a financial institution) generally have access to confidential and sensitive information associated with the enterprise organization and/or customers of the enterprise organization. An enterprise organization has a duty and a responsibility to protect such information. In many instances, confidential and secure information may be vulnerable to unauthorized access and/or misappropriation. In some instances, such unauthorized access and/or misappropriation may occur via an enterprise user, and/or an enterprise device associated with an enterprise user. Accordingly, it may be of significant importance for an enterprise organization to devise ways in which to protect the integrity of an enterprise device and/or an enterprise user. Fast and reliable responses to potential unauthorized activity may be of significant importance to ensuring enterprise security.

Some aspects of the disclosure relate to managing enterprise security by utilizing a smart keyboard and a smart mouse. For example, a smart keyboard and/or a smart mouse may detect user activity, and identify a potentially unauthorized activity, and then initiate remediation tasks. Fast information processing, fast data transmission rates, availability of bandwidth, accuracy of location data, and availability of multiple simultaneous communication channels may be significant factors in managing enterprise security by utilizing a smart keyboard and a smart mouse.

Figure 1:
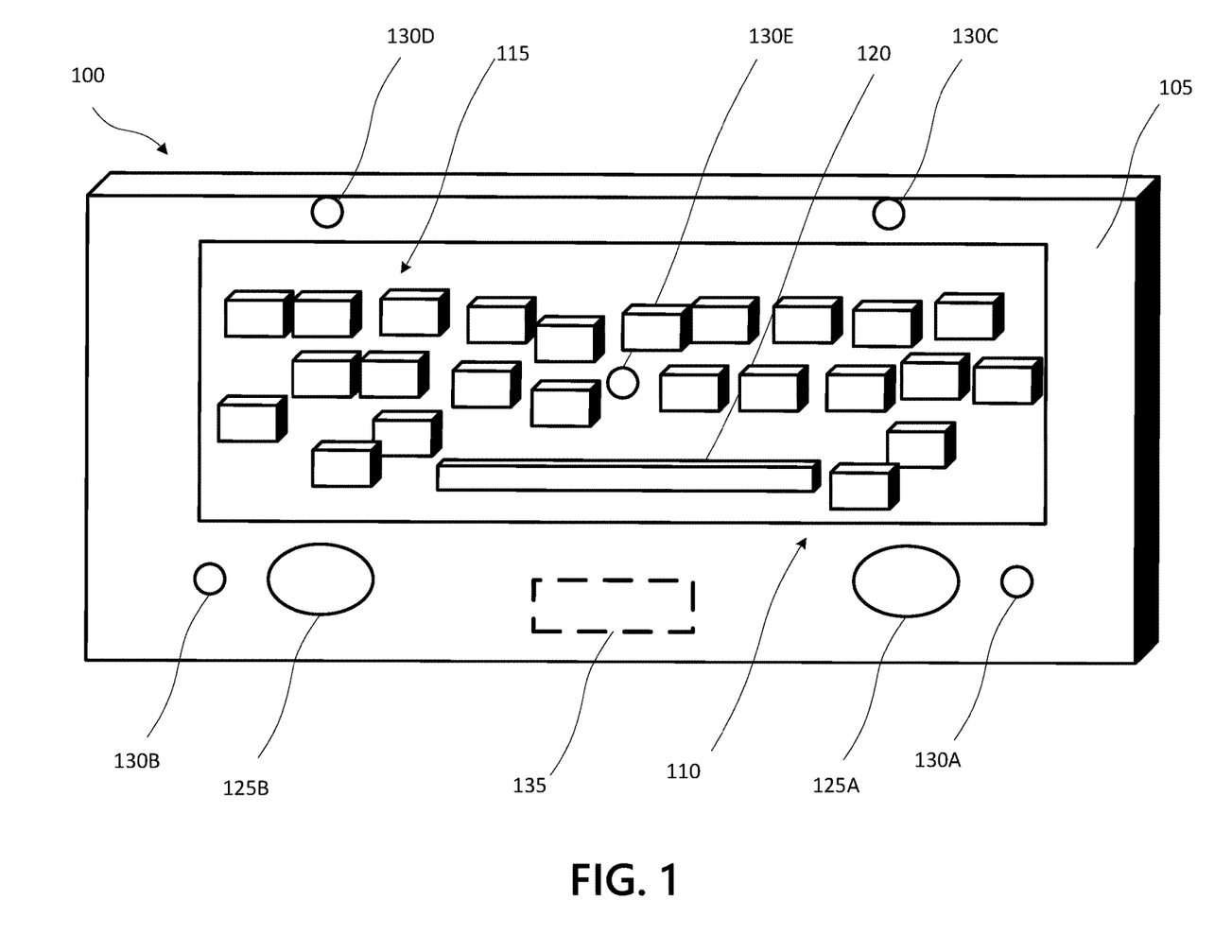
FIG. 1 depicts an illustrative smart keyboard for managing enterprise security by utilizing a smart keyboard and a smart mouse.

FIG. 1 depicts an illustrative smart keyboard for managing enterprise security by utilizing a smart keyboard and a smart mouse. Referring to FIG. 1, smart keyboard 100 may include an outer casing comprising a top surface 105, sides and a bottom. In some embodiments, embedded within top surface 105 may be a portion 110 that houses pressure sensitive keys 115. For example, portion 110 may house a pressure sensitive space bar 120.

In some embodiments, the one or more pressure sensitive keys 115 may be configurable to detect a typing activity associated with the user. For example, a user may apply a certain pressure on certain keys, and pressure sensitive keys 115 may be configurable to detect and store such pressure data. For example, a user may apply more pressure on pressure sensitive space bar 120 (e.g., the user may use a thumb to press pressure sensitive space bar 120), while the user may apply less pressure on the pressure sensitive key corresponding to a key for "enter". Also, for example, depending on a position of the hands of the user, and/or a typing style of the user, varying amounts of pressure may be applied to different pressure sensitive keys. Accordingly, pressure sensitive keys 115 may be configurable to detect and store such pressure data (e.g., in an enterprise storage platform, locally at smart keyboard 100, locally at a computing device associated with smart keyboard 100, and/or a combination of these).

In some embodiments, the typing activity associated with the user may be a speed of typing. For example, some users may have an ability to type faster than others. Also, for example, consecutive keys may be pressed with different timings. For example, a first user may type letters "a" and "s" without much delay in between, whereas a second user may type the same letters with a delay in time. Pressure sensitive keys 115 may be configurable to detect additional and/or alternate typing patterns.

In some embodiments, such data from pressure sensitive keys 115 may be normalized over time, to provide a norm for typing activity associated with a user of smart keyboard 100. For example, smart keyboard 100 may be associated with a specific enterprise user, and a norm for typing activity may be determined for the enterprise user. Accordingly, when a deviation from the norm is detected by pressure sensitive keys 115, then such detection may be further analyzed by the enterprise organization that employs the enterprise user. For example, an enterprise user may be distraught and may be typing in anger. Accordingly, it is likely that the amount of pressure applied to various pressure sensitive keys may be different. For example, the enterprise user may be applying additional pressure to a pressure sensitive key for "enter", and/or to a pressure sensitive key for the character "!". Pressure sensitive keys 115 may detect such deviation from the norm for the typing activity associated with the enterprise user, and send a notification to an enterprise computing infrastructure, as described in detail later.

In some embodiments, the smart keyboard 100 may be configurable to detect abnormal typing activity indicative of a presence of malware. For example, in some instances where malware is introduced into a computing device, the malware may cause entry of text into the computing device.

In such instances, an entry of text by the malware may differ from norm for the typing activity associated with the enterprise user associated with the computing device. Accordingly, smart keyboard 100 may detect such deviation from the norm for the typing activity associated with the enterprise user, and send a notification to an enterprise computing infrastructure to alert it to a presence of the malware. In some instances, as described below, smart keyboard 100 may detect an absence of a user in a vicinity of smart keyboard 100 (e.g., via an image capturing device) to confirm presence of the malware. In some embodiments, smart keyboard 100 may detect (e.g., via facial recognition techniques in an image capturing device) presence of a user different from the enterprise user associated with smart keyboard 100. Also, for example, smart keyboard 100 may identify an unauthorized remote user entering text (e.g., detect absence of a user of smart keyboard 100 in combination with information about a remote login). Smart keyboard 100 may be configurable to detect such abnormal typing activity based on a deviation from the norm for the typing activity associated with the enterprise user.

In some embodiments, top surface 105 may include a physical sensor (e.g., physical sensor 125A, physical sensor 125B) that may be configurable to detect a user characteristic associated with a user of the smart keyboard. Although physical sensor 125A and physical sensor 125B are depicted for illustration purposes only, there may be a plurality of physical sensors at various locations on smart keyboard 100. For example, in some embodiments, the physical sensors may be located along a side of smart keyboard 100. Also, for example, fingerprint detection sensors may be located on one or more pressure sensitive keys 115.

In some embodiments, the at least one physical sensor may be configurable to detect a fingerprint associated with the user. For example, the fingerprint detection sensors located on one or more pressure sensitive keys 115 may detect a fingerprint pattern for an enterprise user associated with smart keyboard 100. The physical sensor to detect a fingerprint may be an optical sensor, a capacitive sensor, an ultrasonic sensor, and/or based on any other type of fingerprint scanning technology. Pressure sensitive keys 115 may identify a norm of fingerprint data associated with a user of smart keyboard 100. Accordingly, when an unauthorized user is present, pressure sensitive keys 115 may detect new fingerprint data, identify a deviation from the norm for the typing activity associated with the enterprise user, and send a notification to an enterprise computing infrastructure.

In some embodiments, the at least one physical sensor may be configurable to detect an electrothermal activity associated with the user. Generally, electrothermal activity causes variations in electrical characteristics of a human skin.

In some embodiments, the electrothermal activity may include a change in skin conductivity associated with the user. For example, electrodermal activity may be generated by sweat glands (e.g., detectable as moisture) in human skin in response to stimuli such as changes in coughing, loud sounds, being startled, stress (e.g., mental, emotional, psychological, and so forth), aggressive behavior, lying behavior, and so forth. Such electrothermal activity in human skin may be detected by physical sensors located on smart keyboard 100. In some embodiments, smart keyboard 100 may identify a norm for such, and other, electrothermal activities associated with a user of smart keyboard 100. Accordingly, when an electrothermal activity associated with a user deviates from such norm, smart keyboard 100 may be configurable to detect such a deviation.

In some embodiments, the at least one physical sensor may be configurable to detect a respiratory activity associated with the user. For example, respiratory activity of a user may undergo change due to various external and internal stimuli, such as, for example, stress (e.g., mental, emotional, psychological, and so forth), aggressive behavior, fear, anxiety, and so forth. One or more physical sensors located on smart keyboard 100 may be configurable to detect respiratory activity associated with the user. In some embodiments, smart keyboard 100 may identify a norm for such respiratory activity associated with a user of smart keyboard 100. Accordingly, when a respiratory activity associated with the user deviates from such norm, smart keyboard 100 may be configurable to detect such a deviation.

In some embodiments, smart keyboard 100 may include an image capturing device. One or more such image capturing devices may be located along top surface 105. For example, smart keyboard 100 may include lens apertures (e.g., lens aperture 130A, lens aperture 130B, lens aperture 130C, lens aperture 130D, and lens aperture 130E) through which respective image capturing devices may capture images of an activity in a vicinity of the smart keyboard. Although the lens apertures are shown to be relatively large for illustrative purposes, actual lens apertures may be small (e.g., to appear non-intrusive). Although a plurality of lens apertures are depicted for illustrative purposes only, in some embodiments, smart keyboard 100 may include a single lens aperture for one image capturing device. In some embodiments, the image capturing devices may be housed within the outer casing of smart keyboard 100. In some embodiments, the lens apertures may be located between pressure sensitive keys 115, as illustrated, for example, by lens aperture 130E. In some embodiments, the image capturing devices may be configurable to change an angle of capture of an image, so as to provide further flexibility in capturing a face of a user from various angles, or in capturing images displayed on a display device associated with smart keyboard 100, and/or in capturing an image of a vicinity of smart keyboard 100.

In some embodiments, the image capturing device may be configurable to detect, based on facial recognition techniques, a change in facial activity associated with the user. For example, the image capturing device may be configurable to detect facial expressions associated with anger, stress, distress, fear, anxiety, furrowed eyebrows, and so forth. Also, for example, the image capturing device may be configurable to detect increased blood flow in a face (e.g., a blush). In some embodiments, the image capturing device may be configurable to detect retinal activity associated with a user. For example, a retina may dilate in response to internal, and/or external stimuli, and the image capturing device may be configurable to detect such activity. In some embodiments, smart keyboard 100 may identify a norm for such facial activity associated with a user of smart keyboard 100. Accordingly, when a facial activity associated with the user deviates from such norm, smart keyboard 100 may be configurable to detect such a deviation.

In some embodiments, the image capturing device may be configurable to capture an image of a display device associated with smart keyboard 100. For example, a first image capturing device may detect a user (e.g., an enterprise user associated with smart keyboard 100, an unauthorized user in a vicinity of smart keyboard 100), and the first image capturing device may detect the unauthorized user attempting to capture an image of contents displayed on the display device associated with smart keyboard 100. Accordingly, smart keyboard 100 may cause a second image capturing device to capture an image of the displayed contents. In some embodiments, smart keyboard 100 may cause the display to be shut down, and initiate additional and/or alternation remediation measures (e.g., restrict access to smart keyboard 100, a computing device, cause an alert notification to be sent, cause an alarm to sound from smart keyboard 100, and so forth).

In some embodiments, smart keyboard 100 may include a switch, communicatively coupled to the pressure sensitive keys, the physical sensor, and the image capturing device, where the switch is configurable to activate or deactivate the pressure sensitive keys, the physical sensor, and the image capturing device. For example, a switch may be located within the outer casing, as depicted by switch 135, located below top surface 105. In some instances, one or more of the pressure sensitive keys, the physical sensor, and/or the image capturing device may be temporarily disabled, and then re-enabled via switch 135. As described herein, smart keyboard 100 may utilize input received via pressure sensitive keys, the physical sensor, and/or the image capturing device to determine a norm and deviations from the norm. For example, such inputs may be utilized in combination. For example, smart keyboard 100 may detect unusual typing activity and may utilize switch 135 to enable one or more image capturing devices to detect if an authorized user is present. As another example, smart keyboard 100 may detect unusual typing activity and may utilize switch 135 to enable one or more image capturing devices to determine if there are changes in facial activity. Also, for example, smart keyboard 100 may detect unusual thermal conductivity and/or respiratory activity and may utilize switch 135 to enable one or more image capturing devices to determine if there are changes in facial activity. In some instances, smart keyboard 100 may detect unusual facial activity via an image capturing device, and may utilize switch 135 to enable one or more physical sensors to determine if there are changes in thermal conductivity, typing behavior, and so forth.

In some embodiments, switch 135 may be utilized to manage a monitoring activity associated with a user of smart keyboard 100. For example, an enterprise organization may determine to detect electrothermal activity at periodic intervals of time (e.g., weekly, monthly, and so forth). Accordingly, switch 135 may be configured to automatically switch on, at such predetermined periodic intervals of time), the physical sensors that may detect the electrothermal activity. Also, for example, the enterprise organization may determine to detect fingerprint activity each time a login activity occurs in a computing device associated with smart keyboard 100, and/or a password is entered into a password entry field in a graphical user interface associated with smart keyboard 100. Accordingly, switch 135 may be configured to automatically switch on the physical sensors that may detect the fingerprint activity at such login, and/or password entry times.

In some embodiments, the monitoring activity may be performed in the background. In some instances, such monitoring activity may be ongoing, and in some instances, such monitoring activity may be at periodic intervals of time. In some embodiments, monitoring activity may be performed by providing a notification to an enterprise user. For example, the enterprise user may be prompted to place their finger on a physical sensor to detect fingerprint activity.

Figure 2:
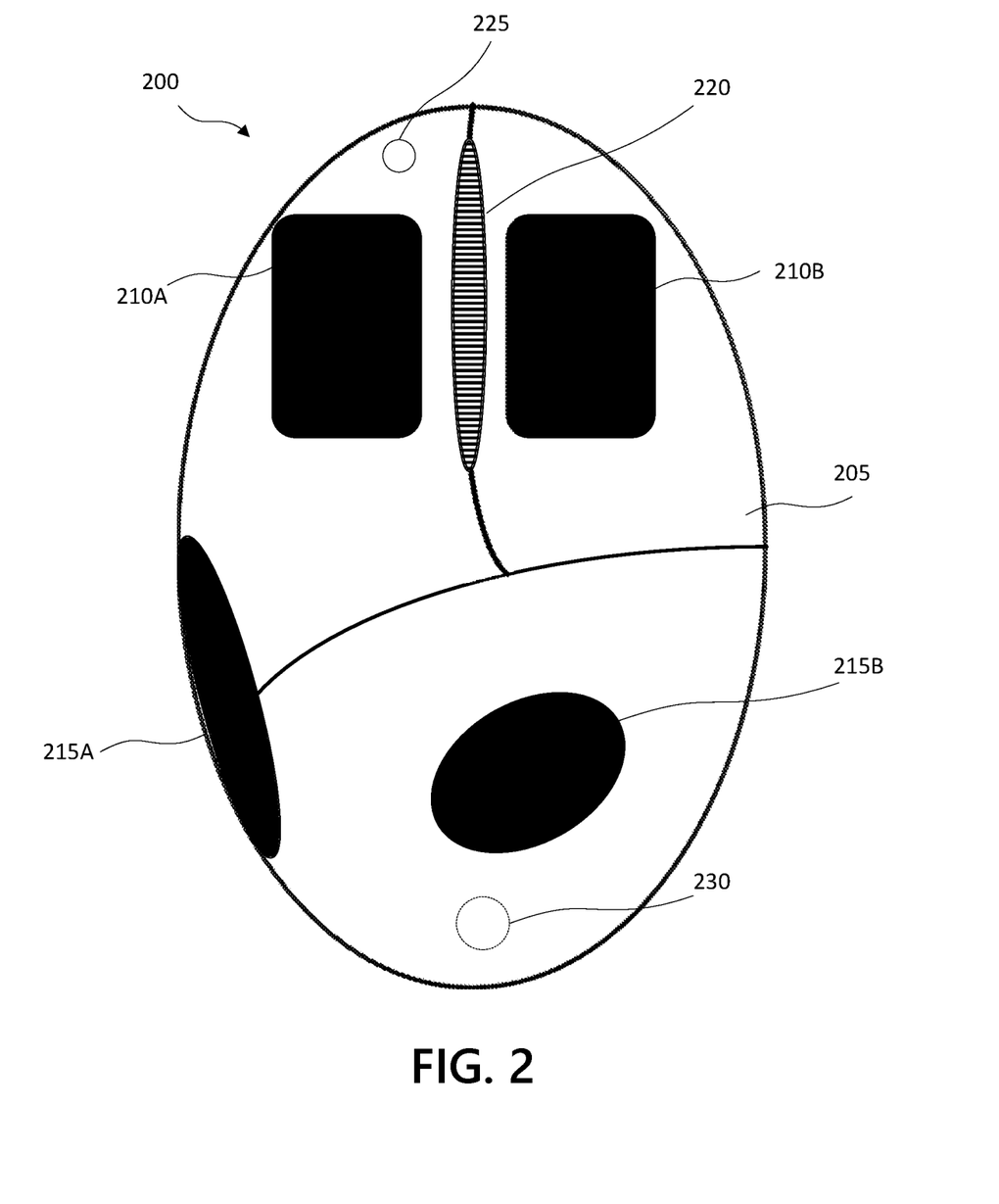
FIG. 2 depicts an illustrative smart mouse for managing enterprise security by utilizing a smart keyboard and a smart mouse.

FIG. 2 depicts an illustrative smart mouse for managing enterprise security by utilizing a smart keyboard and a smart mouse. Referring to FIG. 2, a smart mouse 200 is illustrated. Smart mouse 200 may comprise an outer surface 205, and house at least one processor, a communication interface, and a memory within outer surface 205. Smart mouse 200 may include one or more pressure sensitive clickable components (e.g., clickable component 210A and clickable component 210B), at least one physical sensor (e.g., physical sensor 215A and physical sensor 215B) configurable to detect a user characteristic associated with a user of smart mouse 200, and a wheel 220.

In some embodiments, the at least one physical sensor (e.g., physical sensor 215A and physical sensor 215B) may be configurable to detect a fingerprint associated with the user of the smart mouse. For example, physical sensor 215A may be located along a left side of a mouse (for a right-handed user), and physical sensor 215A may detect a fingerprint for the user of smart mouse 200.

In some embodiments, the at least one physical sensor may be configurable to detect an electrothermal activity associated with the user of the smart mouse. As described herein with reference to smart keyboard 100, the at least one physical sensor may also be configurable to detect various physical and/or biological characteristics associated with the user of smart mouse 200.

In some embodiments, smart mouse 200 may include an image capturing device (via lens aperture 225), where the image capturing device may be configurable to capture an image of an activity in a vicinity of the smart mouse. As described herein with reference to smart keyboard 100, the image capturing device associated with smart mouse 200 may also be configurable to detect facial activity, retinal activity, and/or capture images in a vicinity of smart mouse 200.

In some embodiments, wheel 220 may be configurable to detect a scrolling activity associated with the user of the smart mouse. For example, a user of smart mouse 200 may have a normal scrolling activity, and smart mouse 200 may be configured to identify a norm (e.g., based on statistical techniques) for scrolling activity associated with the user. Accordingly, when a scrolling activity associated with the user deviates from such norm (e.g., user may be distressed), smart mouse 200 may be configurable to detect such a deviation.

In some embodiments, smart mouse 200 may include a second switch 230, communicatively coupled to pressure sensitive clickable components (e.g., clickable component 210A and clickable component 210B), at least one physical sensor (e.g., physical sensor 215A and physical sensor 215B), wheel 220, and/or the image capturing device (via lens aperture 225), where the second switch 230 is configurable to activate or deactivate these components. For example, second switch 230 may be housed within outer surface 205. Additional switch 230 may function in a manner similar to switch 135 of smart keyboard 100. In some embodiments, switch 135 of smart keyboard 100 may be in communication with second switch 230 of smart mouse 200, via a network (e.g., a Bluetooth or other near-field communication network).

In some embodiments, switch 135 of smart keyboard 100 may coordinate with second switch 230 of smart mouse 200 to toggle on and off the various components of smart keyboard 100 and/or smart mouse 200. For example, switch 135 and additional switch 230 may simultaneously enable respective image capturing devices to capture an image of a user. As another example, switch 135 and additional switch 230 may enable respective physical sensors to detect fingerprint activity to confirm an identity of a user.

In some embodiments, smart mouse 200 may include an infrared beam, where the smart mouse is configurable to detect, based on the infrared beam, a movement activity of the smart mouse associated with the user of the smart mouse. For example, smart mouse 200 may include an infrared beam at a lower surface of smart mouse 200. As smart mouse 200 is moved, movement activity data may be detected. In some embodiments, smart mouse 200 may identify a norm for such movement activity associated with a user of smart mouse 200. Accordingly, when a movement activity associated with the user deviates from such norm, smart mouse 200 may be configurable to detect such a deviation.

In some embodiments, machine learning techniques may be applied over time to determine when to toggle a switch on and off, what components to utilize at what time, types of images to capture, and so forth. Also, for example, machine learning techniques may be applied to determine time periods during which monitoring activity may be enabled automatically. As another example, machine learning techniques may be applied to identify enterprise locations, enterprise users, and/or enterprise devices that may be vulnerable to a security breach. Also, for example, machine learning techniques may be applied to learn if switching on one component may trigger another component to be switched on. Additional and/or alternative machine behaviors may be learned based on machine learning techniques.

Figure 3A:
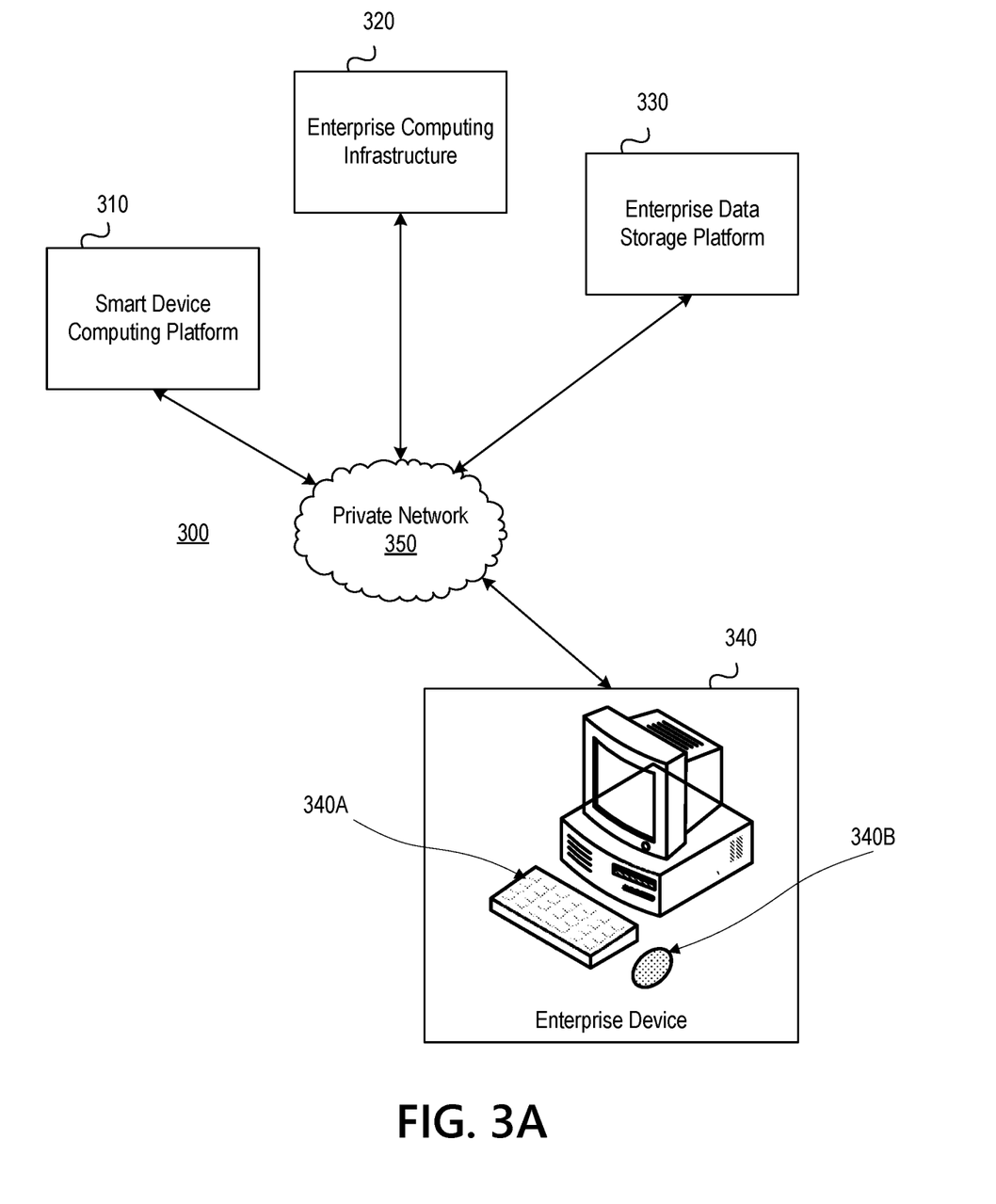
FIGS. 3A-3C depict an illustrative computing environment for managing enterprise security by utilizing a smart keyboard and a smart mouse.
Figure 3B:
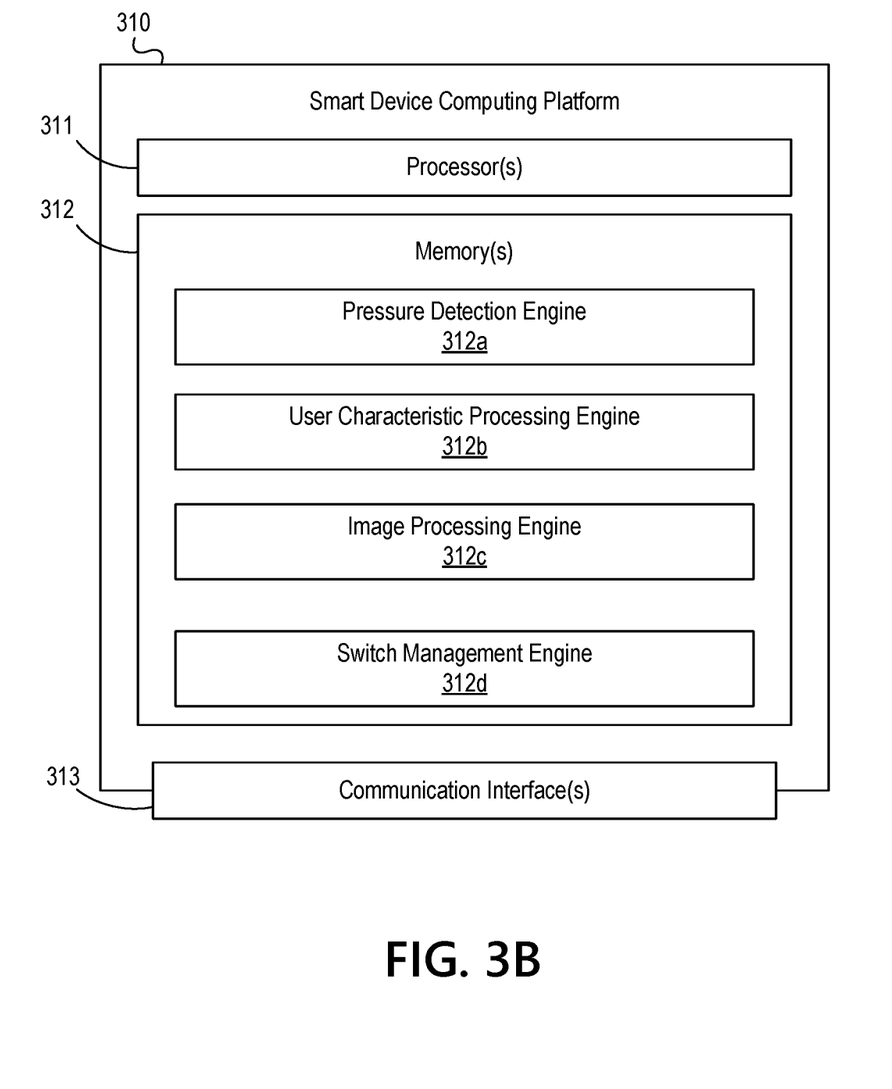
Figure 3C:
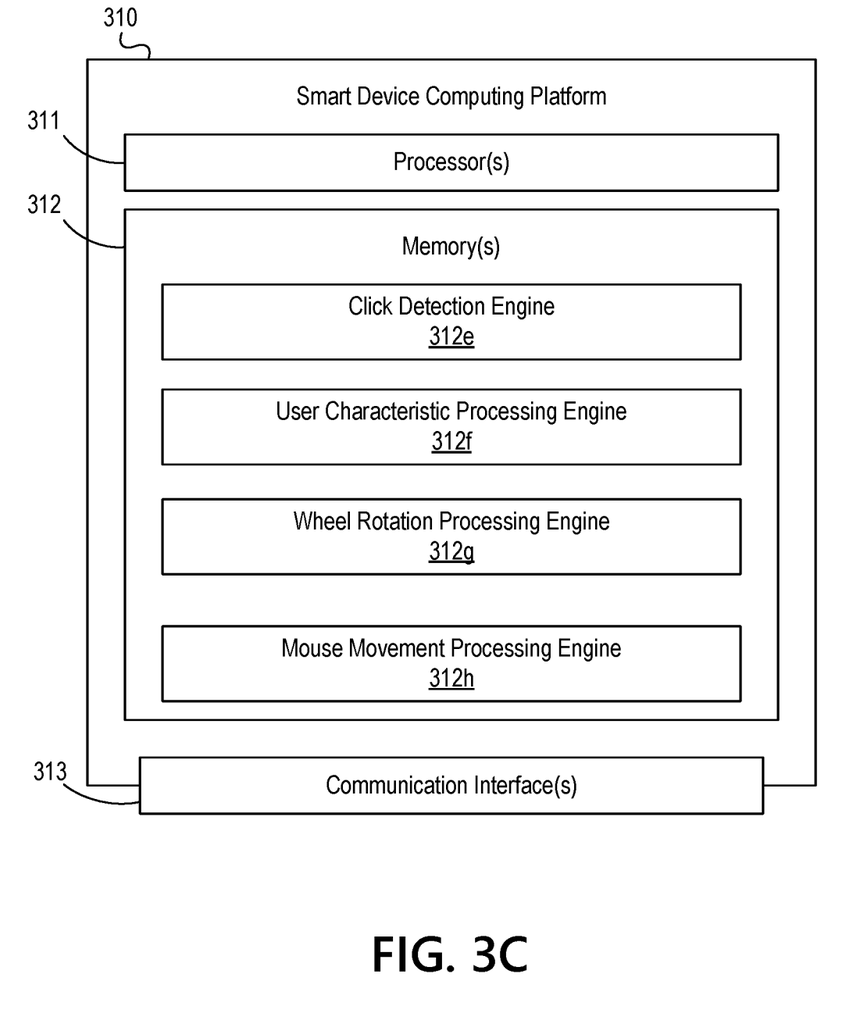

FIGS. 3A-3C depict an illustrative computing environment for managing enterprise security by utilizing a smart keyboard and a smart mouse. Referring to FIG. 3A, computing environment 300 may include one or more computer systems. For example, computing environment 300 may include smart device computing platform 310, enterprise computing infrastructure 320, enterprise data storage platform 330, and enterprise smart device 340.

As illustrated in greater detail below, smart device computing platform 310 may include one or more computing devices configured to perform one or more of the functions described herein. For example, smart device computing platform 310 may include one or more computers (e.g., laptop computers, desktop computers, servers, server blades, or the like) and/or other computer components (e.g., processors, memories, communication interfaces).

Enterprise computing infrastructure 320 may include one or more computing devices and/or other computer components (e.g., processors, memories, communication interfaces). In addition, enterprise computing infrastructure 320 may be configured to host, execute, and/or otherwise provide one or more enterprise applications. For example, enterprise computing infrastructure 320 may be configured to host, execute, and/or otherwise provide one or more alert notification systems, and/or other programs associated with an enterprise server, such as a trading platform. In some instances, enterprise computing infrastructure 320 may be configured to provide various enterprise and/or back-office computing functions for an enterprise organization, such as a financial institution. For example, enterprise computing infrastructure 320 may include various servers and/or databases that store and/or otherwise maintain account information, such as financial account information including account balances, transaction history, account owner information, and/or other information. In addition, enterprise computing infrastructure 320 may process and/or otherwise execute remediation tasks based on commands and/or other information received from other computer systems included in computing environment 300. Additionally, or alternatively, enterprise computing infrastructure 320 may receive instructions from smart device computing platform 310 to initiate remediation tasks and execute such instructions in a timely manner.

Enterprise data storage platform 330 may include one or more computing devices and/or other computer components (e.g., processors, memories, communication interfaces). In addition, and as illustrated in greater detail below, enterprise data storage platform 330 may be configured to store and/or otherwise maintain enterprise data. Additionally, or alternatively, enterprise computing infrastructure 320 may be configured to store and/or otherwise maintain data related to user characteristics. For example, enterprise computing infrastructure 320 may be configured to store and/or otherwise maintain historical data related to users, biometric identifiers associated with users, behavioral identifiers associated with users, typing activity data, electrothermal activity data associated with users, facial features associated with users, location data of computing devices, and so forth. Additionally, or alternatively, enterprise computing infrastructure 320 may load data from enterprise data storage platform 330, manipulate and/or otherwise process such data, and return modified data and/or other data to enterprise data storage platform 330 and/or to other computer systems included in computing environment 300.

Enterprise smart device 340 may be a personal computing device (e.g., desktop computer, laptop computer) or mobile computing device (e.g., smartphone, tablet, wearable device). Enterprise smart device 340 may comprise smart keyboard 340A, and/or smart mouse 340B. In addition, enterprise smart device 340 may be linked to and/or used by a specific enterprise user (who may be, e.g., an employee of a financial institution or other organization operating smart device computing platform 310).

Smart keyboard 340A may include one or more pressure sensitive keys, at least one physical sensor configurable to detect a user characteristic associated with an enterprise user, at least one image capturing device that may be configurable to capture an image of an activity in a vicinity of the smart keyboard, and a switch, communicatively coupled to the one or more pressure sensitive keys, the at least one physical sensor, and the at least one image capturing device, where the switch may be configurable to activate or deactivate the one or more pressure sensitive keys, the at least one physical sensor, and the at least one image capturing device.

In some embodiments, smart mouse 340B may include a wheel, one or more pressure sensitive clickable components, and at least one additional physical sensor configurable to detect the user characteristic associated with the enterprise user.

Computing environment 300 also may include one or more networks, which may interconnect one or more of smart device computing platform 310, enterprise computing infrastructure 320, enterprise data storage platform 330, and enterprise smart device 340. For example, computing environment 300 may include private network 350 (which may interconnect, for example, smart device computing platform 310, enterprise computing infrastructure 320, enterprise data storage platform 330, and/or one or more other systems which may be associated with an organization, such as a financial institution). Private network 350 may be a high generation cellular network, such as, for example, a 5G or higher cellular network. In some embodiments, computing environment 300 also may include a local network (which may, e.g., interconnect enterprise smart device 340 and one or more other devices with each other). For example, the local network may interconnect smart keyboard 340A and/or smart mouse 340B to each other, and/or to a computing device, an/or a display device. The local network may be configured to send and/or receive data via different protocols, e.g. Bluetooth, Wireless Fidelity ("Wi-Fi"), near field communication ("NFC"), Infrared, cellular, and/or other protocols that enable device to device communication over short distances. In some embodiments, the local network may be connected to private network 350.

In one or more arrangements, enterprise computing infrastructure 320, enterprise data storage platform 330, and enterprise smart device 340, and/or the other systems included in computing environment 300 may be any type of computing device capable of communicating with a user interface, receiving input via the user interface, and communicating the received input to one or more other computing devices. For example, enterprise computing infrastructure 320, enterprise data storage platform 330, and enterprise smart device 340, and/or the other systems included in computing environment 300 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of smart device computing platform 310, enterprise computing infrastructure 320, enterprise data storage platform 330, and enterprise smart device 340, may, in some instances, be special-purpose computing devices configured to perform specific functions.

Referring to FIG. 3B, smart device computing platform 310 may include one or more processors 311, memory 312, and communication interface 313. A data bus may interconnect processor 311, memory 312, and communication interface 313. Communication interface 313 may be a network interface configured to support communication between smart device computing platform 310 and one or more networks (e.g., public network, private network, a local network, or the like). Memory 312 may include one or more program modules having instructions that when executed by processor 311 cause smart device computing platform 310 to perform one or more functions described herein and/or one or more databases that may store and/or otherwise maintain information which may be used by such program modules and/or processor 311. In some instances, the one or more program modules and/or databases may be stored by and/or maintained in different memory units of smart device computing platform 310 and/or by different computing devices that may form and/or otherwise make up smart device computing platform 310.

For example, memory 312 may have, store, and/or include pressure detection engine 312a, user characteristic processing engine 312b, image processing engine 312c, and switch management engine 312d. In some embodiments, memory 312 may be a part of smart keyboard 340A. Pressure detection engine 312a may have instructions that direct and/or cause smart device computing platform 310 to detect a typing activity associated with the user of the smart keyboard. In some embodiments, pressure detection engine 312a may have instructions that direct and/or cause smart device computing platform 310 to detect, via the smart keyboard, abnormal typing activity indicative of a presence of malware. User characteristic processing engine 312b may have instructions that direct and/or cause smart device computing platform 310 to detect a fingerprint associated with the user of the smart keyboard. In some embodiments, user characteristic processing engine 312b may have instructions that direct and/or cause smart device computing platform 310 to detect an electrothermal activity associated with the user of the smart keyboard. In some embodiments, user characteristic processing engine 312b may have instructions that direct and/or cause smart device computing platform 310 to detect a change in skin moisture level associated with the user of the smart keyboard. Image processing engine 312c may have instructions to analyze the textual data to detect, based on facial recognition techniques, a change in facial activity associated with the user of the smart keyboard. In some embodiments, image processing engine 312c may have instructions that direct and/or cause smart device computing platform 310 to detect a change in retinal activity associated with the user of the smart keyboard. Switch management engine 312d may have instructions that direct and/or cause smart device computing platform 310 to activate or deactivate the one or more pressure sensitive keys of the smart keyboard, the at least one physical sensor of the smart keyboard, and the at least one image capturing device of the smart keyboard.

Referring to FIG. 3C, for example, memory 315 may have, store, and/or include click detection engine 312e, user characteristic processing engine 312f, wheel rotation processing engine 312g, and mouse movement processing engine 312h. In some embodiments, memory 312 may be a part of smart mouse 340B. Click detection engine 312e may have instructions that direct and/or cause smart device computing platform 310 to detect a clicking activity associated with the user of the smart mouse. User characteristic processing engine 312f may have instructions to detect an electrothermal activity associated with the user of the smart mouse. In some embodiments, user characteristic processing engine 312f may have instructions that direct and/or cause smart device computing platform 310 to detect a change in skin moisture level associated with the user of the smart mouse. Wheel rotation processing engine 312g may have instructions that direct and/or cause smart device computing platform 310 to detect a scrolling activity associated with the user of the smart mouse. Mouse movement processing engine 312h may have instructions that direct and/or cause smart device computing platform 310 to detect, based on an infrared beam in the smart mouse, a movement activity of the smart mouse associated with the user of the smart mouse.

Figure 4:
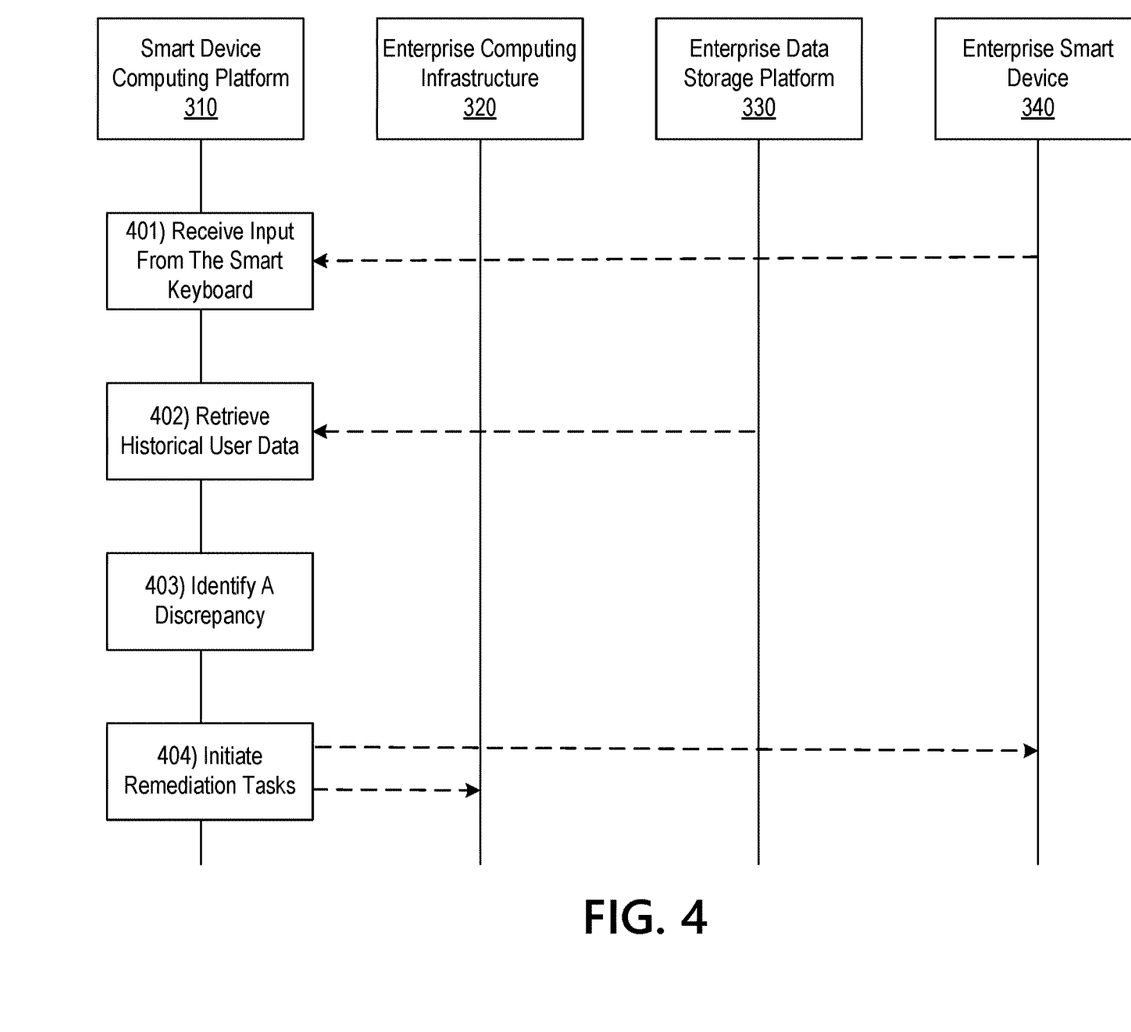
FIG. 4 depicts an illustrative event sequence for managing enterprise security by utilizing a smart keyboard and a smart mouse.

FIG. 4 depicts an illustrative event sequence for managing enterprise security by utilizing a smart keyboard and a smart mouse. Referring to FIG. 4, at step 401, smart device computing platform 310 may receive an input, via the enterprise smart device 340. For example, smart device computing platform 310 may receive an input via smart keyboard 340A, where the input may include one or more of keystroke data from the one or more pressure sensitive keys, the user characteristic and the image of the activity. Also, for example, at step 401, smart device computing platform 310 may receive a second input, via smart mouse 340B, where the second input comprises one or more of scrolling data from the wheel, click data from the one or more pressure sensitive clickable components, and the user characteristic associated with the enterprise user.

At step 402, smart device computing platform 310 may retrieve, from a database, historical user data associated with the input and the enterprise user. As described herein, enterprise computing infrastructure 320 may include various servers and/or databases (e.g., enterprise data storage platform 330) that store and/or otherwise maintain sensitive information, such as fingerprint data, facial recognition data, retina scanning data, keystroke data, mouse movement data, mouse clicking data, electrothermal activity data, skin moisture level, and/or other confidential and sensitive data.

At step 403, smart device computing platform 310 may identify, based on a comparison of the input and the historical user data, a discrepancy associated with the input. For example, smart device computing platform 310 may access the enterprise data storage platform (e.g., enterprise data storage platform 330) to retrieve stored historical user data, and compare these with the input received via smart keyboard 340A and/or the second input received via smart mouse 340B, and use the comparison to identify a discrepancy associated with the input and/or the second input. For example, enterprise data storage platform (e.g., enterprise data storage platform 330) may store a norm for data associated with a user, and smart device computing platform 310 may, based on an input, detect a deviation from such norm.

In some embodiments, input data may include data related to body temperature activity associated with the enterprise user. For example, smart device computing platform 310 may compare body temperature activity received from the computing device (e.g., enterprise smart device 340) with body temperature activity associated with the user as retrieved from the enterprise data storage platform (e.g., enterprise data storage platform 330) and use the comparison to identify a discrepancy. Also, for example, input data may include data related to a change in heart rate activity associated with the enterprise user. Accordingly, smart device computing platform 310 may compare the change in heart rate activity received from the computing device (e.g., enterprise smart device 340) with a change in heart rate activity associated with the user as retrieved from the enterprise data storage platform (e.g., enterprise data storage platform 330) and use the comparison to identify a discrepancy.

Similar comparisons may be made for input data related to changes in skin conductivity, skin moisture levels, changes in facial activity, typing activity, mouse clicking activity, mouse scrolling activity, mouse movement activity, and so forth.

At step 404, smart device computing platform 310 may initiate, in response to the discrepancy, one or more remediation tasks. For example, in response to the discrepancy, smart device computing platform 310 may cause enterprise smart device 340 to shut down. As another example, in response to the discrepancy, smart device computing platform 310 may cause smart keyboard 340A, and/or smart mouse 340B to be disabled. Also, for example, in response to the discrepancy, smart device computing platform 310 may trigger an alert for relevant enterprise personnel by causing enterprise computing infrastructure 320 to send notifications and/or alerts to the relevant enterprise personnel. For example, if a threat activity is detected, then smart device computing platform 310 may trigger an alert for security personnel, and/or law enforcement personnel.

For example, if the discrepancy is large (e.g., outside a threshold range of a statistical norm), smart device computing platform 310 may automatically initiate the one or more remediation tasks. For example, computing platform 310 may automatically log out an enterprise user and prompt the enterprise user to re-authenticate (e.g., login again, provide fingerprint data, allow an image capture of their face, and so forth). Also, for example, computing platform 310 may automatically restrict access to enterprise resources, access to a network, access to the computing device, black out a screen associated with a display device, and so forth.

In some embodiments, smart device computing platform 310 may be an edge computing platform. For example, smart keyboard 340A may be configurable as an edge computing device, and include smart device computing platform 310. Also, for example, smart mouse 340B may be configurable as an edge computing device, and include smart device computing platform 310. Accordingly, one or more of steps 401 to 404 may be performed as part of the edge computing platform. In some instances, timely identifying discrepancies may be significantly important to enterprise security. Accordingly, performing edge computing may significantly assist rapid detection of potential unauthorized activity, and cause smart device computing platform 310 to initiate a rapid response.

Figure 5:
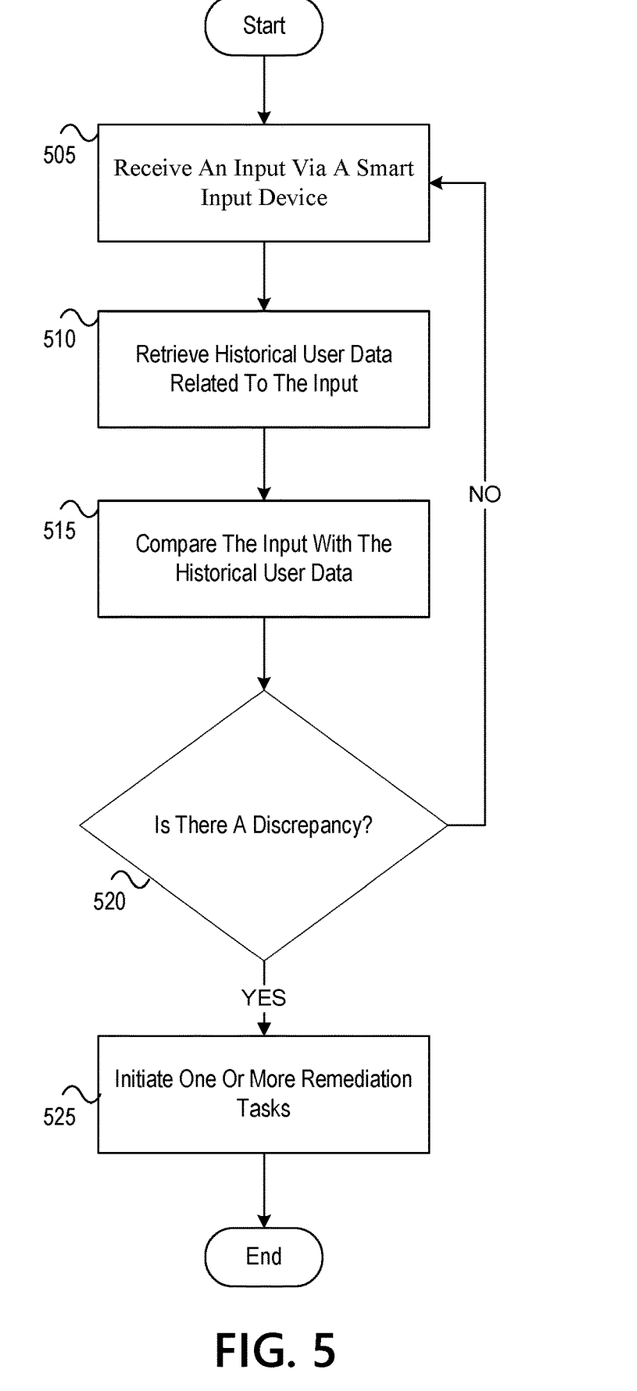
FIG. 5 depicts an illustrative method for managing enterprise security by utilizing a smart keyboard and a smart mouse.

FIG. 5 depicts an illustrative method for managing enterprise security by utilizing a smart keyboard and a smart mouse. Referring to FIG. 5, at step 505, a computing platform having at least one processor, a communication interface, and memory may receive an input, via an enterprise smart device (e.g., a smart keyboard, a smart mouse, and so forth). At step 510, the computing platform may retrieve, from a database, historical user data associated with the input and the enterprise user. At step 515, the computing platform may compare the input and the historical user data. At step 520, the computing platform may determine if there is a discrepancy associated with the input. If a discrepancy is not identified, the process returns to step 505. If a discrepancy is identified, the process proceeds to step 525. At step 525, the computing platform may initiate, in response to the discrepancy, one or more remediation tasks. As described herein, in some embodiments, steps 505 to 525 may be performed by an edge computing device (e.g., a smart keyboard, a smart mouse, and so forth).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A smart keyboard, comprising:
   a memory;
   at least one processor;
   a communication interface communicatively coupled to the at least one processor;
   one or more pressure sensitive keys;
   at least one physical sensor configurable to detect a user characteristic associated with a user of the smart keyboard;
   at least one image capturing device configurable to capture an image of an activity in a vicinity of the smart keyboard; and
   a switch, communicatively coupled to the one or more pressure sensitive keys, the at least one physical sensor, and the at least one image capturing device, wherein the switch is configurable to activate or deactivate the one or more pressure sensitive keys, the at least one physical sensor, and the at least one image capturing device.

2. The smart keyboard of claim 1, wherein the at least one physical sensor is configurable to detect a fingerprint associated with the user.

3. The smart keyboard of claim 1, wherein the at least one physical sensor is configurable to detect an electrothermal activity associated with the user.

4. The smart keyboard of claim 3, wherein the electrothermal activity comprises a change in skin conductivity associated with the user.

5. The smart keyboard of claim 1, wherein the at least one physical sensor is configurable to detect a change in skin moisture level associated with the user.

6. The smart keyboard of claim 1, wherein the image capturing device is configurable to detect, based on facial recognition techniques, a change in facial activity associated with the user.

7. The smart keyboard of claim 1, wherein the one or more pressure sensitive keys are configurable to detect a typing activity associated with the user.

8. The smart keyboard of claim 1, further configurable to detect abnormal typing activity indicative of a presence of malware.

9. A computing platform, comprising:
   a smart keyboard, wherein the smart keyboard further comprises:
      one or more pressure sensitive keys,
      at least one physical sensor configurable to detect a user characteristic associated with an enterprise user,
      at least one image capturing device configurable to capture an image of an activity in a vicinity of the smart keyboard, and
      a switch, communicatively coupled to the one or more pressure sensitive keys, the at least one physical sensor, and the at least one image capturing device, wherein the switch is configurable to activate or deactivate the one or more pressure sensitive keys, the at least one physical sensor, and the at least one image capturing device;
   one or more processors;
   a communication interface communicatively coupled to the one or more processors; and
   memory storing computer-readable instructions that, when executed by the one or more processors, cause the computing platform to:
      receive an input, via the smart keyboard, wherein the input comprises one or more of keystroke data from the one or more pressure sensitive keys, the user characteristic and the image of the activity;
      retrieve, from a database, historical user data associated with the input and the enterprise user;
      identify, based on a comparison of the input and the historical user data, a discrepancy associated with the input; and
      initiate, in response to the discrepancy, one or more remediation tasks.

10. The computing platform of claim 9, further comprising:
    a smart mouse, wherein the smart mouse further comprises:
       a wheel,
       one or more pressure sensitive clickable components, and
       at least one additional physical sensor configurable to detect the user characteristic associated with the enterprise user,
    wherein the memory stores additional computer-readable instructions that, when executed by the one or more processors, cause the computing platform to:
       receive a second input, via the smart mouse, wherein the second input comprises one or more of scrolling data from the wheel, click data from the one or more pressure sensitive clickable components, and the user characteristic associated with the enterprise user;
       retrieve, from the database, additional historical user data associated with the input and the enterprise user;
       identify, based on a second comparison of the second input and the additional historical user data, a second discrepancy associated with the second input; and wherein the initiating the one or more remediation tasks is based on the second discrepancy.

* * * * *